US012599881B2

(12) United States Patent
Studer

(10) Patent No.: US 12,599,881 B2
(45) Date of Patent: Apr. 14, 2026

(54) MIXER

(71) Applicant: IKA-Werke Gmbh & Co. KG, Staufen (DE)

(72) Inventor: Severin Studer, Neuenberg (DE)

(73) Assignee: IKA-Werke Gmbh & Co. KG, Staufen (DE)

( * ) Notice: Subject to any disclaimer, the term of this patent is extended or adjusted under 35 U.S.C. 154(b) by 995 days.

(21) Appl. No.: 17/779,750

(22) PCT Filed: Dec. 1, 2020

(86) PCT No.: PCT/EP2020/084170
§ 371 (c)(1),
(2) Date: May 25, 2022

(87) PCT Pub. No.: WO2021/110706
PCT Pub. Date: Jun. 10, 2021

(65) Prior Publication Data

US 2023/0001367 A1 Jan. 5, 2023

(30) Foreign Application Priority Data

Dec. 2, 2019 (DE) ......................... 102019132715.6

(51) Int. Cl.
*B01F 35/212* (2022.01)
*B01F 35/32* (2022.01)
*B01F 35/41* (2022.01)
*B01F 35/30* (2022.01)

(52) U.S. Cl.
CPC ........ *B01F 35/212* (2022.01); *B01F 35/3214* (2022.01); *B01F 35/411* (2022.01); *B01F 2035/352* (2022.01)

(58) Field of Classification Search
CPC ............................ B01F 35/212; B01F 35/222
USPC ......................................................... 366/142
See application file for complete search history.

(56) References Cited

U.S. PATENT DOCUMENTS 2,698,362 A * 12/1954 Bozich .................. G01F 23/226 340/617
3,800,597 A 4/1974 Paul et al.
4,747,690 A * 5/1988 Hayashi ............... A21C 1/1455 366/152.5
5,513,912 A 5/1996 Lotz et al.
5,906,432 A * 5/1999 Wade ................... A21C 1/1455 366/97

(Continued)

FOREIGN PATENT DOCUMENTS

DE 2850486 6/1980
DE 3734019 4/1989

(Continued)

*Primary Examiner* — David L Sorkin
(74) *Attorney, Agent, or Firm* — Volpe Koenig

(57) ABSTRACT

A mixer (1) having a measuring device (5) for determining a torque which can be applied using a mixing device drive (3) of the mixer to a medium to be mixed. The mixing device drive (3) is mounted to pivot within the housing (2) of the mixer (1) and is supported at least indirectly against at least one rotational direction of its two rotational directions. With the aid of the measuring device (5), a reaction force of this at least one support can be detected and from this, the torque applied by the mixing device drive can be determined.

16 Claims, 2 Drawing Sheets

(56) References Cited

U.S. PATENT DOCUMENTS

| | | | | |
|---|---|---|---|---|
| 8,313,229 | B2 * | 11/2012 | Brannon | B01F 35/212 366/279 |
| 10,213,755 | B2 * | 2/2019 | Luharuka | E21B 21/062 |
| 2017/0232411 | A1 * | 8/2017 | Smith | B01F 35/2131 366/142 |

FOREIGN PATENT DOCUMENTS

| | | | |
|---|---|---|---|
| DE | 4401679 | | 7/1995 |
| DE | 102009008074 | A1 | 8/2010 |
| DE | 102010042542 | | 4/2011 |
| DE | 102017010198 | A1 | 5/2018 |
| GB | 682367 | A | 11/1952 |
| WO | 8300101 | | 1/1983 |

* cited by examiner

MIXER

TECHNICAL FIELD

The invention relates to a mixer with a housing and with a mixing device drive arranged in the housing.

BACKGROUND

Mixers of this kind are used as so-called overhead stirrers, viscosimeters, or also as dispersers.

Depending on the application, it may be necessary for a torque, which is applied using the mixing device drive and is introduced into a medium to be mixed using the mixer, to be monitored. Various concepts for this purpose are already known on the market.

Hence, for example, publication DE 44 01 679 A1 discloses a mixer with a holding device, with a mixing tool, and with a measuring device for measuring the torque introduced into the medium to be mixed during mixing.

The torque can therefore be determined indirectly via the electricity/power consumption of the mixing device drive. In this case, the torque which is introduced by the mixing device drive into a medium to be processed using the mixer is derived from the power consumption of said mixing device drive. However, there are applications in which this kind of indirect torque measurement is not sufficiently precise.

In addition, it is known in the art for the torque to be determined with the help of strain gauges which are arranged on a driven shaft of the mixer. The torque can be determined from loading of the driven shaft. Although this kind of torque measurement is comparatively precise, the measuring systems which are set up for this kind of torque determination are comparatively expensive.

SUMMARY

The problem addressed by the invention is therefore that of providing a mixer of the kind referred to above which allows there to be a comparatively favorable and precise torque measurement.

In order to solve this problem, the mixer which has one or more of the features disclosed herein directed at a mixer of this kind is proposed. In order to solve the problem, a mixer with a housing, and with a mixing device drive arranged in said housing, is therefore proposed in particular, wherein the mixing device drive for measuring a torque introduced into a medium to be mixed by said mixing device drive is mounted to pivot about a pivot axis within the housing, and is supported at least indirectly against at least one rotational direction of the mixing device drive. In order to detect a reaction force of this support, the mixer has a measuring device.

When the mixer is running, the mixing device drive which is pivotably mounted within the housing can be tilted according to the principle of "action equals reaction" and is supported within the housing of the mixer. The reaction force of this support can be accurately detected with the help of the measuring device. The torque applied by the mixing device drive can then be deduced at least indirectly from the reaction force of the support. It has been established that this arrangement for determining the torque which is introduced into the medium being mixed using the mixing device drive is not only comparatively favorable but, moreover, is also accurate to a satisfactory degree.

Integrating the measuring principle into the housing of the mixer means that said housing has a comparatively compact and, at the same time, robust design. The mixer is therefore particularly easy to handle.

It is provided in one embodiment of the mixer that the pivotably mounted mixing device drive is supported against both of its two rotational directions within the housing. The measuring device can be set up to detect reaction forces of both supports. In this way, the torque which is applied by the mixing device drive, and is introduced into a medium to be mixed, can be determined irrespective of which of the two rotational directions the mixing device drive is operated in.

The measuring device of the mixer may have at least one force sensor with which the reaction force of the at least one support can be measured. The measuring device preferably has at least one force sensor with which the reaction forces of the two supports can be measured. In one embodiment of the mixer, the mixing device drive can be supported in the housing at least indirectly against the at least one force sensor.

At this point, it should be mentioned that the housing in which the mixing device drive is arranged can be referred to as the drive housing of the mixer.

The mixing device drive may be connected to the measuring device, in particular to the at least one force sensor of the measuring device, at least indirectly, in such a manner that reaction forces of the supports of the mixing device drive can be detected against both of its rotational directions.

In a preferred embodiment of the mixer, the pivot axis about which the mixing device drive is pivotably mounted within the housing is congruent with a rotational axis of an output shaft of the mixer. In this variant of the mixer, a joint mounting can be used for the pivot mounting of the mixing device drive and for the swivel mounting of the output shaft of the mixer. This may reduce the engineering effort involved in the mixer.

In one embodiment of the mixer, the pivot axis about which the mixing device drive is pivotably mounted, is spaced apart, in particular spaced apart in a parallel manner or skewed, from a rotational axis of an output shaft of the mixer. In a different embodiment, the pivot axis of the mixing device drive intersects a rotational axis of an output shaft of the mixer. In these embodiments, the mixer may have a mounting, in particular a pivot bearing, for the mixing device drive, and a separate mounting, in particular a swivel mounting, for the output shaft.

The mixing device drive may be pivot-mounted in such a manner that the pivot axis of the mixing device drive runs through the mixing device drive. In this embodiment, the mixer may have a mounting for the mixing device drive, which is then designed as a pivot bearing, and a separate mounting for an output shaft of the mixer. The mixing device drive may also be pivot-mounted in such a manner that the pivot axis is spaced apart, in particularly spaced apart in a parallel manner or skewed, from a rotational axis of a driven shaft of the mixing device drive, or that the pivot axis intersects a rotational axis of a driven shaft of the mixing device drive.

In a preferred embodiment of the mixer, the mixing device drive may be arranged on a holding arm mounted to pivot, in particular about the pivot axis, within the housing. The holding arm can ensure a distance between the pivot axis and the mixing device drive and thereby increase the reaction force that can be determined using the measuring device.

One or the at least one force sensor of the measuring device may be arranged in such a manner, preferably within the housing, that the mixing device drive, its holding arm and/or a force transmission element connected at least temporarily to the mixing device drive can be supported at least indirectly against the at least one force sensor.

The mixer may have a mounting with at least one bearing for the pivotable mounting of the mixing device drive in the housing. The at least one bearing may be a plain bearing or also a rolling bearing, for example. The mounting preferably comprises two bearings of this kind, with which the mixer is arranged in a pivotably mounted manner within the housing.

In a preferred embodiment of the mixer, the mounting for the pivot mounting of the mixing device drive is also used for the swivel mounting of an output shaft of the mixer. In this case, a rotational axis of the output shaft and the pivot axis of the mixing device drive may be congruent. In this embodiment, the pivot mounting of the mixing device drive then also takes on the function of the swivel bearing of the output shaft, or vice versa. Consequently, a separate mounting for the output shaft of the mixer or a separate mounting for the mixing device drive can be dispensed with.

At least one force sensor of the measuring device, for example the force sensor already mentioned previously, may be connected to a sensor arm and/or have a sensor arm. The sensor arm may be used as a force transducer, with which a supporting force or reaction force exerted on the sensor arm can be transmitted to the force sensor. The sensor arm may have at least one contact surface for supporting the pivotably mounted mixing device drive against at least one rotational direction of the mixing device drive. In this way, it is possible for the force sensor to be provided spaced apart from the mixing device drive, preferably within the housing of the mixer.

In one embodiment of the mixer, at least one contact surface for supporting the pivotably mounted mixing device drive against both rotational directions of the mixing device drive is assigned to one, in particular the already previously mentioned at least one, force sensor of the measuring device. This at least one contact surface may be arranged or configured on the sensor, for example.

In one embodiment of the mixer, two contact faces for supporting the pivotably mounted mixing device drive are assigned to one, in particular the already previously mentioned at least one, force sensor of the measuring device. Of these contact surfaces, one contact surface in each case can be arranged or configured on one of two different sides of the force sensor, which are opposite one another or facing away from one another.

In one embodiment of the mixer, one force sensor of the measuring device, in particular the at least one force sensor already previously mentioned, is connected to a sensor arm which has at least one contact surface for supporting the pivotably mounted mixing device drive against both rotational directions of the mixing device drive.

In a further embodiment of the mixing device, a force sensor, in particular the at least one force sensor already previously mentioned, is connected to a sensor arm which has a contact surface on each of two different, preferably opposite, sides, one of which is provided and used, in each case, to support the mixing device drive against one of its two rotational directions.

The mixing device drive may have a force transmission element or be connected to a force transmission element, with which the at least one contact surface of the sensor arm for supporting against at least one rotational direction of the mixing device drive is contactable. In this way, a distance between the mixing device drive, on the one hand, and the at least one force sensor of the measuring device of the mixing device, on the other, can be increased, as a result of which the measurement principle in respect of the use of the available installation space within the housing is particularly flexible.

In one embodiment, the mixing device drive and/or a force transmission element, for example the holding arm already mentioned previously and/or a force transmission element, for example that already previously mentioned, have at least one support surface, via which the mixing device drive can be supported within the housing at least indirectly against at least one of its two rotational directions. The mixing device drive may be configured as an electric motor which has a rotatably driven shaft. The driven shaft may be connected at least indirectly to an output shaft of the mixer.

In one embodiment of the mixer, the driven shaft of the mixing device drive may be used as the output shaft of the mixer.

A strain gauge, a pressure sensor, a piezoelectric force sensor, a piezo-resistive force sensor, a piezoelectric pressure sensor, a capacitive pressure sensor, an oscillating wire transducer, or an electromagnetic pressure converter can be used as the force sensor. The mixer may be designed as an overhead stirrer, as a viscosimeter, or also as a disperser, for example.

BRIEF DESCRIPTION OF THE DRAWINGS

The invention is described in greater detail with the help of an exemplary embodiment, but it is not limited to this exemplary embodiment. Further exemplary embodiments result by combining features of individual, or multiple, protection claims with one another and/or combining individual, or multiple, features of the exemplary embodiment. The drawings show, as a partially highly schematized representation:

DETAILED DESCRIPTION

Figure 1:
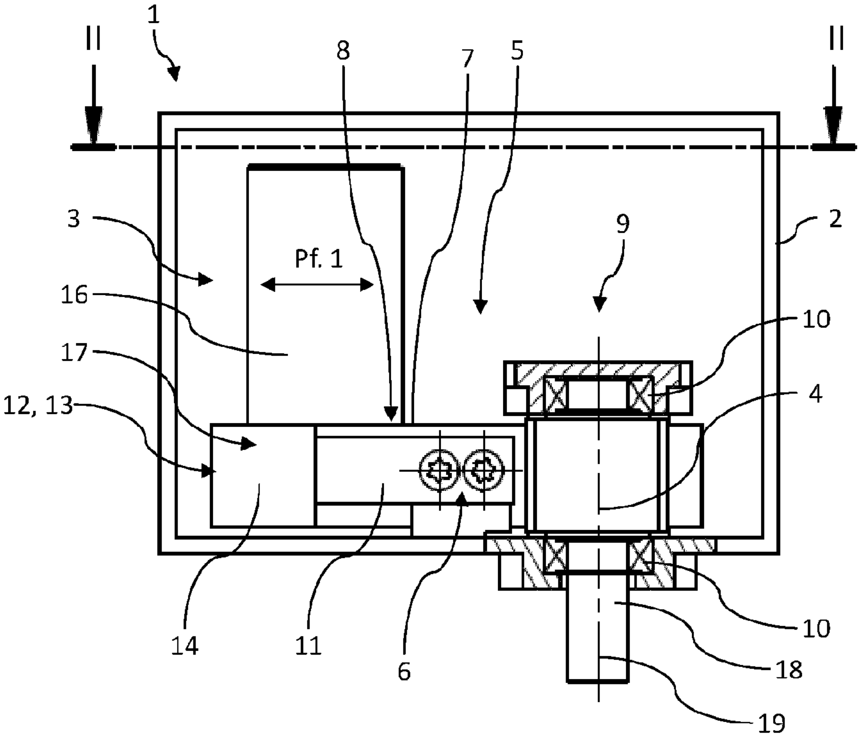
FIG. 1: shows a side view of a mixer with a mixing device drive which is arranged in a housing of the mixer and pivotably mounted there.
Figure 2:
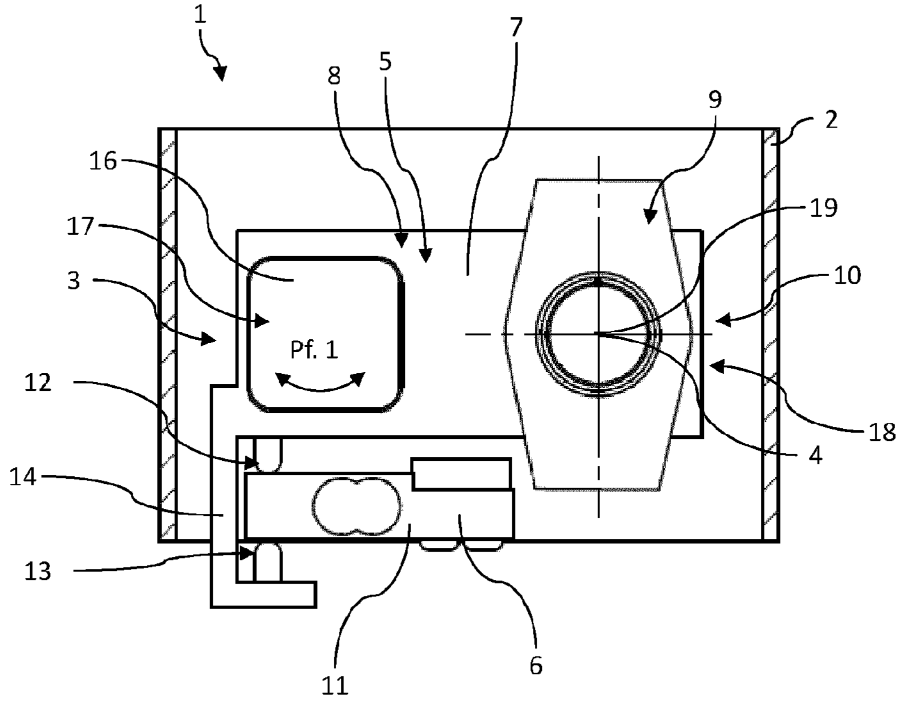
FIG. 2: shows a sectional view of the mixer with the mixing device drive arranged in a rotatably mounted manner therein along the line shown in FIG. 1, FIG. 3: shows a highly schematized representation of the mixing device drive, with possible support surfaces depicted in hatched lines in this case, via which support surfaces the mixing device drive for detecting the reaction forces can be supported at least indirectly against a force sensor of the measuring device of the mixer.

All the figures show at least parts of a mixer designated as a whole as 1. The mixer 1 has a housing 2 and a mixing device drive 3 arranged within the housing 2. The mixing device drive 3 is pivotably mounted about a pivot axis 4 within the housing 2, in order to determine a torque introduced by the mixing device drive 3 into a medium to be mixed.

The mixing device drive 3 is supported within the housing 2 against its two rotational directions (cf. double arrow PF 1). In order to detect reaction forces of these two supports, the mixer 1 has a measuring device 5. The measuring device 5 is set up to detect reaction forces of both supports.

For this purpose, the measuring device 5 has a force sensor 6. The force sensor 6 is used to receive and measure the reaction forces of both supports. For this purpose, the pivotably mounted mixing device drive 3 is supported within the housing 2 against the force sensor 6.

The mixing device drive 3 is connected to the measuring device 5 and its force sensor 6 at least indirectly in such a manner that reaction forces of the supports of the mixing device drive 3 can be detected against both of its rotational directions.

The mixing device drive 3 is arranged within the housing 2 on a pivotably mounted holding arm 7. A gear mechanism 8 with which an output speed delivered by the mixing device drive 3 can be increased or reduced by an increasing or a reducing ratio may be arranged within the holding arm 7, for example. The mixer 1 comprises a mounting 9 with a total of two bearings 10, which are designed as rolling bearings in the exemplary embodiment shown in the figures. The mounting 9 is used for the pivot mounting of the mixing device drive 3 within the housing 2 of the mixer 1.

The force sensor 6 of the measuring device 5 is, for its part, connected to a sensor arm 11. The sensor arm 11 has two contact surfaces 12 and 13 which are provided to support the pivotably mounted mixing drive 3 against its two rotational directions. The contact surfaces 12 and 13 are arranged on opposite sides of the sensor arm 11 in this case.

The mixer 1 further comprises a force transmission element 14 which is connected to the mixing device drive 3. The force transmission element 14 is used for contacting the contact surfaces 12 and 13 of the sensor arm 11 for support against its two rotational directions of the mixing device drive 3, thereby to support the pivotably mounted mixing device drive 3 at least indirectly on the force sensor 6, and to transmit the reaction forces thereby generated for determining a torque to the force sensor 6.

A strain gauge, a pressure sensor, a piezoelectric force sensor, a piezo-resistive force sensor, a piezoelectric pressure sensor, a capacitive pressure sensor, a oscillating wire transducer, or an electromagnetic pressure converter can be used as the force sensor. The mixer may be designed as an overhead stirrer, as a viscosimeter or also as a disperser, for example.

Figure 3:
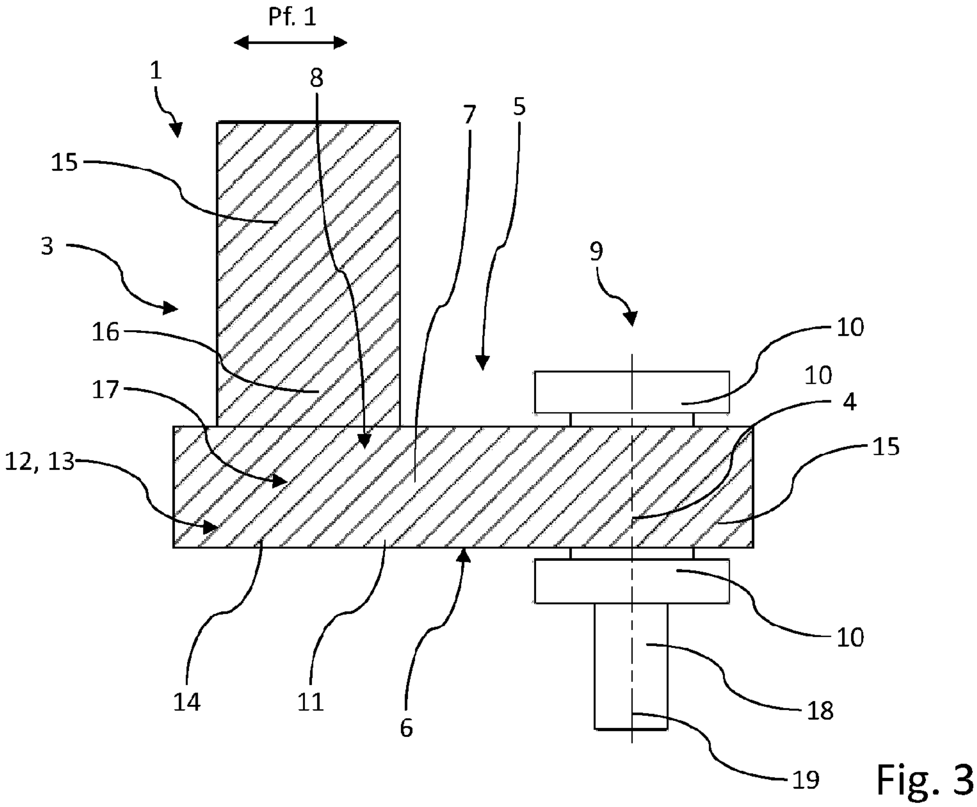
Figure 4:
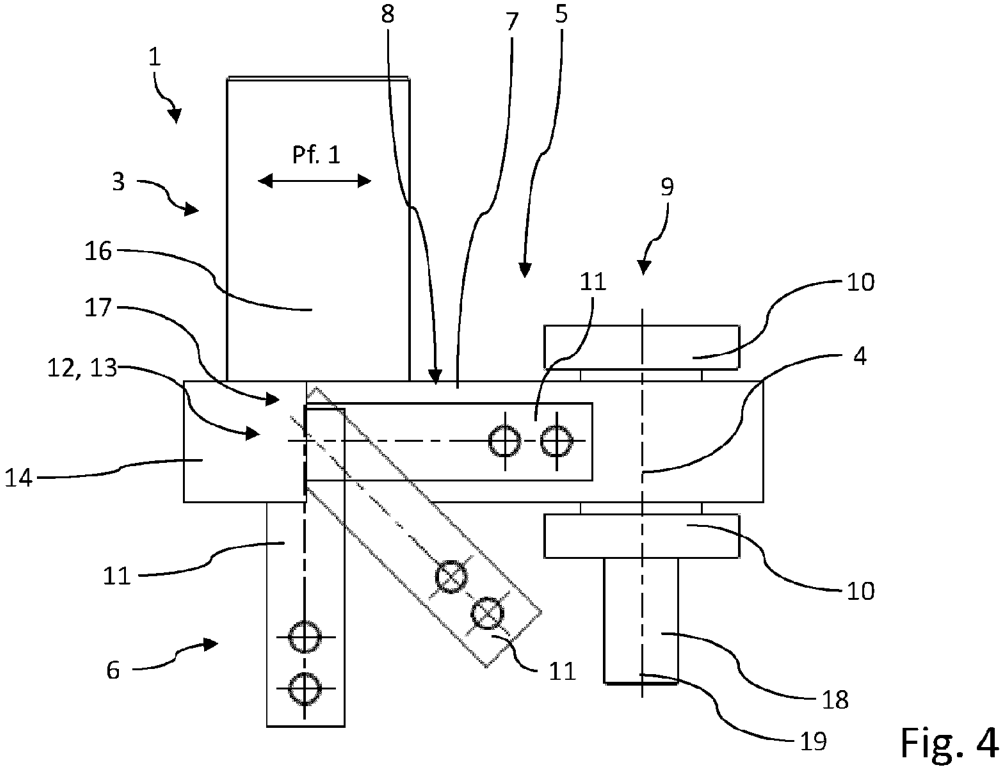
FIG. 4: shows a highly schematized side view of the mixing device drive with its mounting, wherein in this case possible positions of a force sensor connected to a sensor arm are depicted.

FIG. 3 illustrates potential support surfaces 15 on the mixing device drive 3 and the holding arm 7, which can be used to support the mixing device drive 3 at least indirectly. The support surfaces 15 are depicted in hatched lines. FIG. 4 shows a small selection of possible arrangements of the force sensor 6 and the sensor arm 11 thereof relative to the pivotably mounted mixing device drive 3.

In the exemplary embodiment shown, the mixing device drive 3 is designed as an electric motor 16 which is connected to an output shaft 18 of the mixer with its driven shaft 17 via the gear mechanism 8. The output shaft 18 of the mixer 1 is mounted by the two bearings 10 of the mounting 9. Consequently, the mounting 9 is used both for the pivot mounting of the mixing device drive 3 and for the swivel mounting of the output shaft 18 of the mixer 1. A rotational axis 19 of the output shaft 18 is thereby mounted congruently with the pivot axis 4, about which the mixing device drive 3 is pivotably mounted within the housing 2.

In the case of an embodiment of the mixer 1 not shown in the figures, the pivot axis 4 about which the mixing device drive 3 is pivotably mounted within the housing 2 is not congruent with a rotational axis of an output shaft of the mixer 1. With an embodiment of the mixer of this kind, the pivot axis 4 may be spaced apart, in particular spaced apart in a parallel manner or skewed, from the rotational axis 19 of the output shaft 18, or it may intersect the rotational axis 19 of the output shaft 18.

The mixing device drive 3 in this case has its own mounting, which can then be designed as a pivot mounting and referred to as such. In an embodiment of the mixer 1 not shown in the figures, the pivot axis 4 about which the mixing device drive 3 is pivotably mounted within the housing 2 may run through the mixing device drive 3 and/or be congruent with a rotational axis of the driven shaft 17 of the mixing device drive 3.

The mixer 1 may be designed as an overhead stirrer, as a viscosimeter, or as a disperser, for example.

The invention relates to a mixer 1. In order to determine a torque that can be introduced into a medium to be mixed using a mixing device drive 3 of the mixer, said mixer 1 has a measuring device 5. The mixing device drive 3 is pivotably mounted within the housing 2 of the mixer 1, and is supported at least indirectly against at least one rotational direction of its two rotational directions. With the help of the measuring device 5, a reaction force of this at least one support can be detected, and the torque of the mixing device drive which is applied determined from this.

LIST OF REFERENCE SIGNS

1 mixer
2 housing
3 mixing device drive
4 pivot axis
5 measuring device
6 force sensor
7 holding arm
8 gear mechanism
9 mounting
10 bearing
11 sensor arm
12 contact surface at 11
13 contact surface at 11
14 force transmission element
15 supporting surface at 3 and 7
16 electric motor
17 driven shaft of 3
18 output shaft of 1
19 rotational axis of 18

The invention claimed is:

1. A mixer (1), comprising:

a housing (2);

a mixing device drive (3) arranged in the housing (2), the mixing device drive (3) being configured for measuring a torque introduced into a medium to be mixed by said mixing device drive (3) being mounted to pivot about a pivot axis (4) within the housing (2);

a support that at least indirectly supports the mixing device drive (3) against at least one of first and second rotational directions (Pf 1) of the mixing device drive (3);

a measuring device (5) configured to detect a reaction force of said support; and a holding arm (7) on which the mixing device drive (3) is arranged, the holding arm (7) being mounted to pivot within the housing (2).

2. The mixer (1) as claimed in claim 1, wherein the support comprises a first contact surface (12) that at least indirectly supports the mixing drive device (3) against the first rotational direction and a second contact surface (13)

that at least indirectly supports the mixing device drive (3) against the second rotational direction.

3. The mixer (1) as claimed in claim 1, wherein the measuring device (5) comprises at least one force sensor (6) configured to measure the reaction force.

4. The mixer (1) as claimed in claim 2, wherein the mixing device drive (3) is at least indirectly connected to the measuring device (5) such that the reaction force resulting from support against both the first and second rotational directions is detectable by the measuring device (5).

5. The mixer (1) as claimed in claim 1, wherein the pivot axis (4) is one of:

(i) congruent with a rotational axis (19) of an output shaft (18) of the mixer (1), (ii) spaced apart from the rotational axis (19) of the output shaft (18), or (iii) intersecting the rotational axis (19) of the output shaft (18).

6. The mixer (1) as claimed in claim 1, wherein the pivot axis (4) is one of:

(i) running through the mixing device drive (3), (ii) congruent with a rotational axis of a driven shaft (17) of the mixing device drive (3), (iii) spaced apart from the rotational axis of the driven shaft (17), or (iv) intersecting the rotational axis of the driven shaft (17).

7. The mixer (1) as claimed in claim 3, wherein the at least one force sensor (6) of the measuring device (5) is arranged such that at least one of the mixing device drive (3), a holding arm (7), or a force transmission element (14) connected at least temporarily to the mixing device drive (3) is supported at least indirectly against the at least one force sensor (6).

8. The mixer (1) as claimed in claim 1, further comprising a mounting (9) with at least one bearing (10) for the pivotable mounting of the mixing device drive (3) about the pivot axis (4).

9. The mixer (1) as claimed in claim 3, wherein the support comprises a sensor arm (11), and the at least one force sensor (6) of the measuring device (5) is connected to the sensor arm (11).

10. The mixer (1) as claimed in claim 2, wherein the measuring device (5) comprises at least one force sensor (6), and at least one of the first contact surface (12) or the second contact surface (13) is associated with the at least one force sensor (6).

11. The mixer (1) as claimed in claim 2, wherein the mixing device drive (3) comprises a force transmission element (14) that is configured to contact at least one of the first contact surface (12) or the second contact surface (13) for at least indirectly supporting the mixing device drive (3) against at least one of the first and second rotational directions.

12. The mixer (1) as claimed in claim 1, wherein at least one of the mixing device drive (3), the holding arm (7), or a force transmission element (14) comprises at least one support surface (15).

13. The mixer (1) as claimed in claim 3, wherein the at least one force sensor (6) is a strain gauge, a pressure sensor, a piezoelectric force sensor, a piezo-resistive force sensor, a piezoelectric pressure sensor, a capacitive pressure sensor, an oscillating wire transducer, or an electromagnetic pressure converter.

14. The mixer (1) as claimed in claim 1, wherein the mixer (1) comprises an overhead stirrer, a viscosimeter, or a disperser.

15. The mixer (1) as claimed in claim 2, wherein the measuring device (5) comprises at least one force sensor (6) configured to measure the reaction force generated from support of the mixing device drive (3) by both the first contact surface (12) and the second contact surface (13).

16. The mixer (1) as claimed in claim 8, wherein the mounting (9) is further configured to support an output shaft (18) of the mixer (1).

* * * * *